US012763045B1

(12) United States Patent
Kamholz

(10) Patent No.: US 12,763,045 B1
(45) Date of Patent: Oct. 13, 2026

(54) CLARINET TONE HOLE ADAPTERS

(71) Applicant: Leah M. Kamholz, Arlington, VA (US)

(72) Inventor: Leah M. Kamholz, Arlington, VA (US)

( * ) Notice: Subject to any disclaimer, the term of this patent is extended or adjusted under 35 U.S.C. 154(b) by 0 days.

(21) Appl. No.: 19/075,701

(22) Filed: Mar. 10, 2025

(51) Int. Cl.
*G10D 9/00* (2020.01)
*G10D 9/047* (2020.01)

(52) U.S. Cl.
CPC .................................... *G10D 9/047* (2020.02)

(58) Field of Classification Search
CPC ...... G10D 9/00; G10D 9/047; G10D 7/00–08; G10D 9/01; G10D 9/04–06; G10D 9/10
See application file for complete search history.

(56) References Cited

U.S. PATENT DOCUMENTS

| | | | | |
|---|---|---|---|---|
| 4,539,888 A * | 9/1985 | Whelan | G10D 7/063 984/145 |
| 4,798,122 A * | 1/1989 | Gisler | G10D 9/047 84/385 P |
| 7,468,479 B2 | 12/2008 | Kraus | |
| 7,851,685 B2 | 12/2010 | Reissner | |
| 9,520,111 B1 * | 12/2016 | Clissold | G10D 9/04 |
| 9,558,725 B2 * | 1/2017 | Uesawa | G10D 9/08 |
| 11,127,382 B1 * | 9/2021 | Ruggles | G10D 7/10 |

OTHER PUBLICATIONS

"Uxcell 240 Pcs M8 PVC Flat Washers 8mm ID 12mm OD 0.5mm Thick"—retrieved from the internet on Aug. 28, 2028 from https://www.amazon.com/dp/B0DRGH9TKW.
"Padding for small fingers" message thread—retrieved from the internet on Aug. 17, 2028 from test.woodwind.org/clarinet/BBoard/read.html?f=1&i=215830&t=215830.
"Plateau Mechanism—Covered Holes"—retrieved from the internet on Mar. 8, 2025 from https://www.clarinet.dk/content/show_content.php?id=101&cont=eu&lang=en&instr=cla.
"10pcs Open Hole Flute Plugs"—retrieved from the internet on Mar. 8, 2025 from https://www.amazon.com/MusicMedic-10pcs-Open-Flute-Plugs/dp/B0829D5DXF.

* cited by examiner

*Primary Examiner* — Christopher Uhlir

(57) ABSTRACT

Adapters that cover or narrow the apertures of clarinet tone holes may be used to make it easier for players with small fingers or reduced finger mobility to achieve air-tight seals of the tone holes. An adapter may be formed, for example, by a disk that is adhered to a top surface of a tone hole with an air-tight seal. The disk defines a hole through the plane of the disk that reduces the diameter of the clarinet tone hole.

20 Claims, 5 Drawing Sheets

CLARINET TONE HOLE ADAPTERS

BACKGROUND

Modern clarinets typically are built with a system of keys, rings, posts, shafts, levers, and springs, called the “Boehm” or “modified Boehm” system. Various components of this system are actuated by the player to control which holes in the instrument are opened or closed, thereby altering the effective length or resonance characteristics of the instrument in order to change the pitch produced.

The modern B-flat soprano clarinet has seven holes, called “tone holes,” which are opened or closed directly by the player’s fingers sealing them. In most clarinets, above six of these holes are positioned “rings,” which are mounted on shafts running longitudinally and swing between an open position above the tone holes and a closed position resting on the tone holes. The shaft is typically biased by a spring to keep the rings in the open position unless the player exerts enough force on one or more rings to depress it to the closed position. Also attached to the shaft are one or more keys that close holes on the clarinet other than tone holes. The rings thus cause those keys to close when any of the rings attached to the same shaft are closed, thus simplifying the fingering procedure. The ring itself does not obstruct airflow through its respective tone hole.

The tone holes underlying rings are typically formed with a raised central turret, the top surface of which is sealed by the player’s finger pad, and a recess surrounding the turret to receive the ring in the closed position such that the top of the ring is flush or near-flush with the top surface of the turret.

The tone holes on a modern B-flat soprano clarinet typically vary in diameter along the instrument, with the tone holes in the upper section progressing from about 4.5 mm to about 6.5 mm and the tone holes in the lower section progressing from about 7 mm to about 10 mm downward along the section. In standard operation, a player presses a finger pad fully down on a tone hole to form an air-tight seal in order to produce a clear tone (for certain advanced techniques such as glissando a player may cover a hole only partially).

A problem may arise, however, if a player’s fingers are too small to cover the hole fully, or a player’s fingers lack full mobility such as due to arthritis, trauma, or neurological impairment. In such cases, a player may find it difficult or impossible to form an air-tight seal, particularly on the lower tone holes, and especially the lowest or largest tone hole. Players with small fingers, such as young children in the early stages of clarinet playing, can find it essentially impossible to close the lower tone holes. Players desiring to wear gloves while playing, such as participants in an outdoor performance, may similarly find it impossible to achieve air-tight seals on the tone holes due to the intervening fabric.

One solution to the problem of tone hole air leaks is to replace the rings with filled-in keys, sometimes called “plateau” keys. Plateau keys fully cover the tone holes regardless of whether the player contacts the entire key surface with a finger, as long as the player presses hard enough. Plateau keys can cause a muffled or distorted sound, however, because they impede airflow out the tone hole when it is uncovered. Plateau clarinets also require considerably more keywork to ensure proper functioning of the clarinet, because plateau keys moving simultaneously into the closed position on a single shaft would make it difficult or impossible for the player to achieve the wide variety of fingerings required to play the range of notes on the clarinet. The revised keywork on a plateau clarinet essentially allows each plateau key to close the non-tone-hole keys without also closing the other plateau keys. Even on more modern plateau clarinets that minimize sound muffling, the additional keywork adds weight to the instrument and increases the maintenance burden.

A solution for a related problem on the flute is the use of hole plugs. Flutes for beginner students are typically made with plateau keys, but flutes for more advanced players and professionals may have key holes. The holes may be fitted with plugs to make an advanced flute easier for a beginner to play. The turret on flute tone holes typically does not extend to the height of the keys, so the plugs do not interfere with the turrets. Such plugs would not work on a clarinet ring, however, because the turret would displace the plug when the ring moves to the closed position.

DETAILED DESCRIPTION

Figure 1:
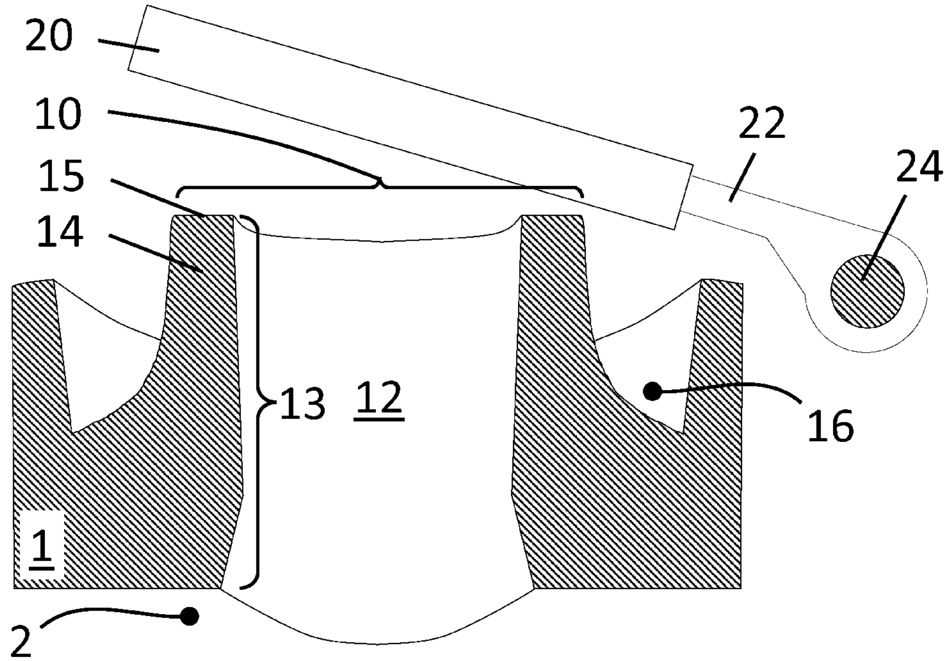
FIG. 1 schematically shows a median longitudinal cross-section of a clarinet tone hole and ring in an open position.

FIG. 1 schematically shows a median longitudinal cross-section (i.e., taken along a plane cutting front-to-back through the middle of a clarinet) of clarinet tone hole 10 and tone hole ring 20. Tone hole ring 20 is depicted in the open position, in which it lies above the tone hole and typically does not contact it. Ring 20 extends from a ring arm 22 which is mounted on shaft 24. Ring arm 22 is typically biased to its open position by a biaser such as a spring (not shown). Shaft 24 is secured to the clarinet body by one or more posts (not shown) that allow shaft 24 and ring arms attached to it to pivot on the shaft long axis. Tone hole 10 is formed in clarinet body 1 and communicates with clarinet main bore 2 by tone hole bore 12. Tone hole bore 12 is defined by circumferential bore wall 13, which extends above the surface of clarinet main body 1 to circumferential turret 14 having top surface 15. Ring sink 16 surrounds bore wall 13 and forms a sunken area relative to the surface of clarinet body 1. Tone hole rings typically have inner diameters of about 8 mm to about 13 mm, with the smaller rings toward the top of the clarinet and larger rings toward the bottom. The rings are typically about 1 mm in width, giving outer diameters of about 10 mm to about 15 mm. Adapters may be sized and shaped to accommodate these dimensions.

Figure 2:
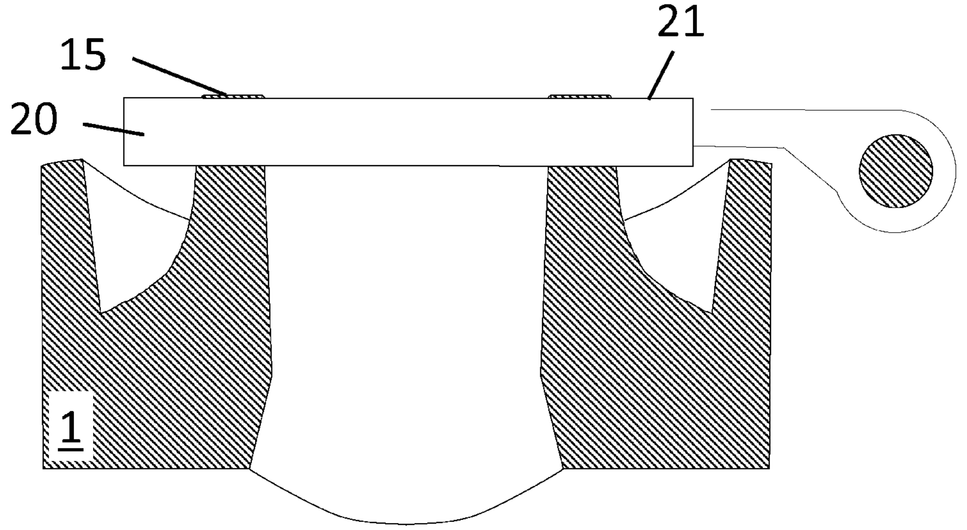
FIG. 2 schematically shows a median longitudinal cross-section of a clarinet tone hole and ring in a closed position.

FIG. 2 schematically shows the same view as FIG. 1 but with tone hole ring 20 in a closed position. In the closed position, top surface 21 of tone hole ring 20 is flush or is approximately flush with top surface 15 of tone hole turret 14. Ring sink 16 provides clearance for tone hole ring 20 to reach its closed position without contacting clarinet body 1. Tone hole ring 20 thus extends at least partly into ring sink 16 when in the closed position.

Figure 3:
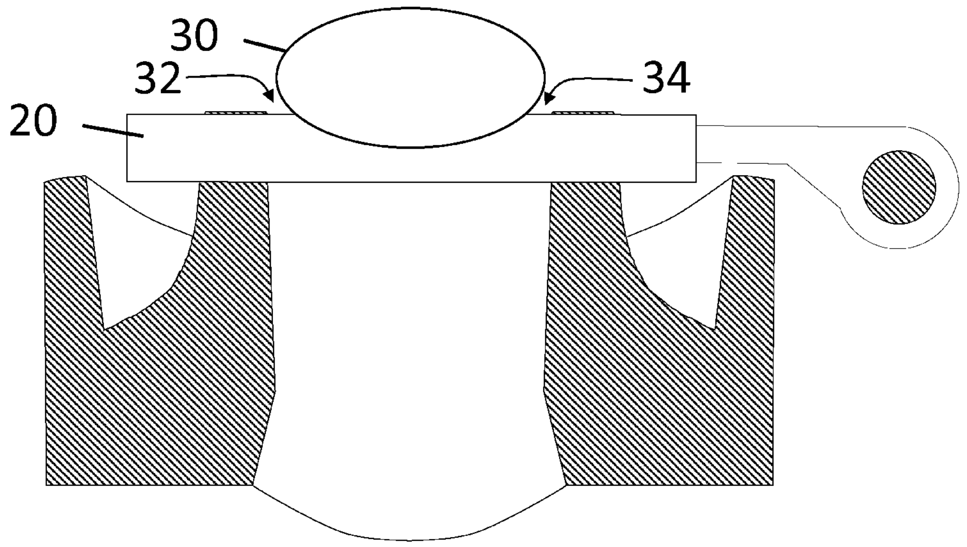
FIG. 3 schematically shows a median longitudinal cross-section of a clarinet tone hole and ring in which the ring is pressed into the closed position by a finger too small to form an air-tight seal.

FIG. 3 schematically shows the same view as FIG. 2 of tone hole ring 20 in the closed position and further shows finger 30 depressing tone hole ring 20 into the closed position. Finger 30 (shown schematically in cross section) is too small, however, to achieve an air-tight seal of tone hole 10 and leaves one or more gaps, for example gap 32 and/or gap 34, thereby allowing air to escape through tone hole 10 and preventing the clarinet from sounding the intended pitch.

Figure 4:
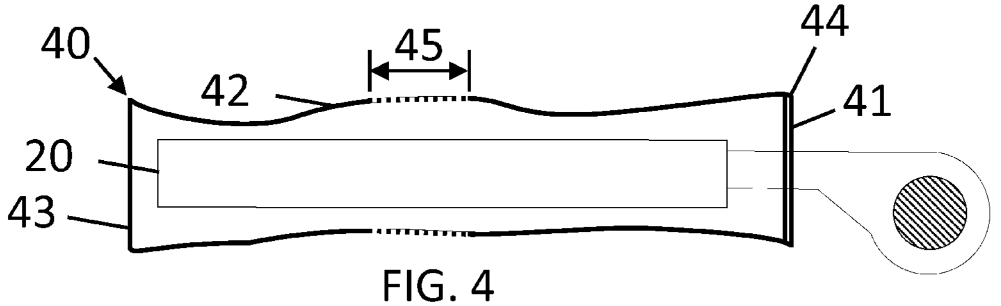
FIG. 4 schematically shows a tone hole ring adapter.

FIG. 4 schematically depicts tone hole ring adapter 40 deployed on tone hole ring 20. In the schematically-depicted embodiment, adapter 40 includes elastomer tube 42. Tube 42 includes first end 41 and second end 43. First end 41 is open, and second end 43 may be open or closed. Elastomer tube 42 may be, for example, the stem portion of a latex balloon, with thickened lip 44 from the balloon forming first end 41 and second end 43 being a cut surface of the balloon. Inclusion of lip 44 or other thickening at first end 41 may help keep adapter 40 in position on tone ring 20 by providing physical obstruction or other resistance to tube 42 slippage. Aperture 45 may be formed in the sidewalls of tube 42 to provide a transverse path for airflow across tube 42. In the case of tube 42 being cut from a balloon stem, aperture 45 may be formed by, for example, pricking or hole-punching the stem. Although shown here loosely surrounding tone hole ring 20, adapter 40 may fit snugly, or it may be stretched to fit around tone hole ring 20.

Figure 5:
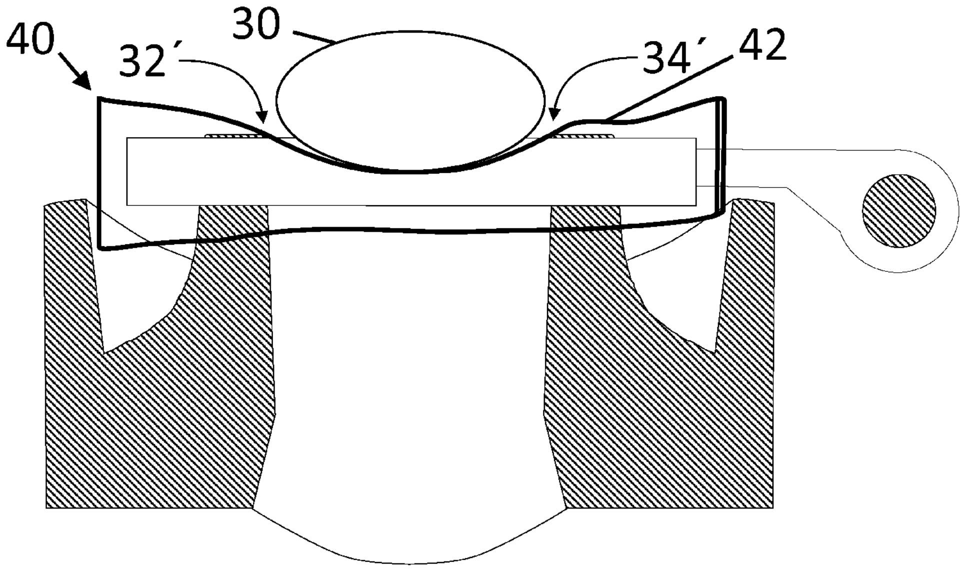
FIG. 5 schematically shows a median longitudinal cross-section of a clarinet tone hole and ring in which a tone hole ring adapter has been fitted to the ring, and the ring is pressed into the closed position by the too-small finger which can now form an air-tight seal.

FIG. 5 shows the same view as FIG. 3 but with ring adapter 40 deployed on tone hole ring 20. Finger 30 is depressing tube 42 of adapter 40, thereby stretching it into tone hole 10 and pressing it into inner edges of top surface 15 (which is flat as shown in FIGS. 1, 2, 3, and 5). The gaps allowing airflow around finger 30 are thereby obliterated (schematically depicted as 32' and 34'). Adapter 40 thereby assists finger 30 in sealing tone hole 10 and allowing the clarinet to sound the intended pitch. When finger 30 is lifted (not shown), tone hole ring 20 returns to the open position and lifts adapter 40 out of contact with tone hole 10, thereby restoring the possibility of airflow through tone hole 10.

Figure 6:
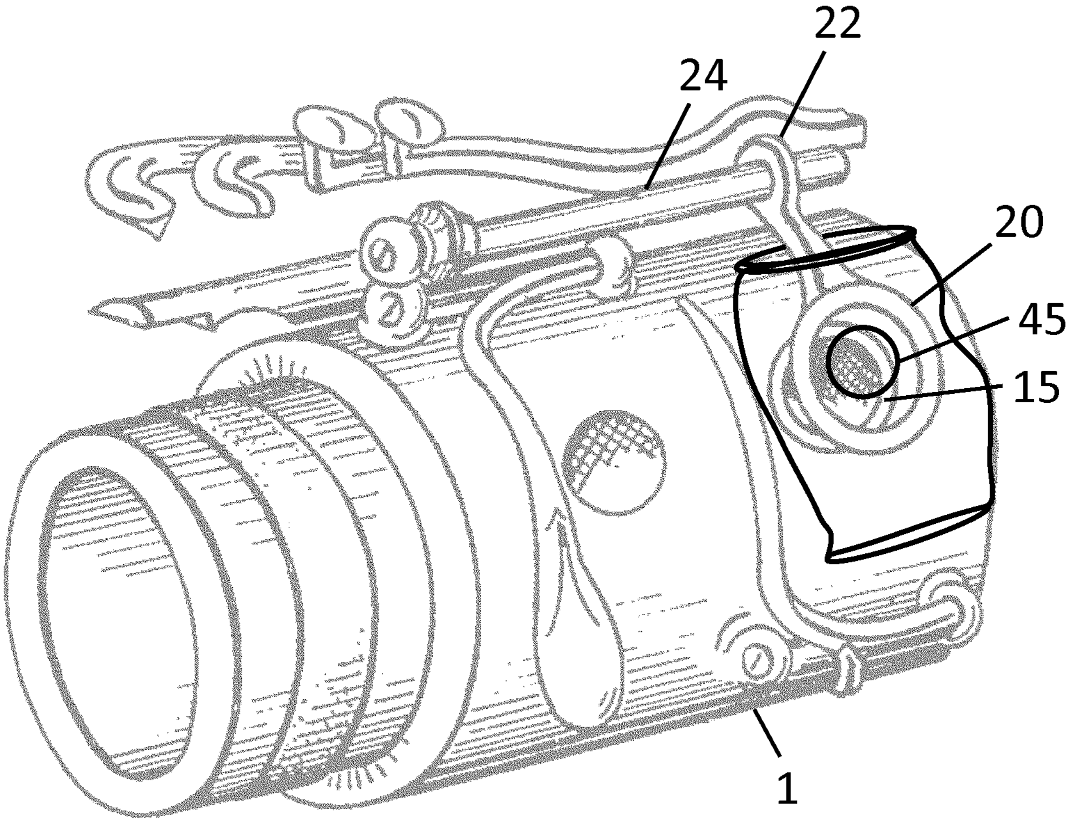
FIG. 6 is a schematic perspective view of a portion of a clarinet in which a tone hole ring adapter has been fitted to a tone hole ring.

FIG. 6 is a perspective view of a portion of a clarinet in which tone hole ring adapter 40 has been fitted to tone hole ring 20. Tone hole ring 20 is in the open position. Adapter 40 includes aperture 45 in its top surface; a similar aperture 45 is provided on the bottom surface of tube 42 (not shown). Clarinet body 1, tone hole top surface 15, tone hole ring arm 22, and shaft 24 are shown for context with the other drawings.

A tone hole ring adapter may serve as a substitute for, or approximation of, a plateau key, in the sense of providing a way to close ringed tone holes with an air-tight seal when the player is otherwise unable to do so. An adapter may be removable or otherwise temporary. An adapter may define apertures in its surfaces separating a player's finger from the tone hole in order to provide a path for air to escape the tone hole across the adapter when a finger is not pressing on the corresponding tone hole ring. The adapter may include a peripheral region sized and shaped to form air-tight contact with a clarinet tone hole ring about the ring's entire circumference. The peripheral region may define a central void (that is, an aperture).

Figure 7:
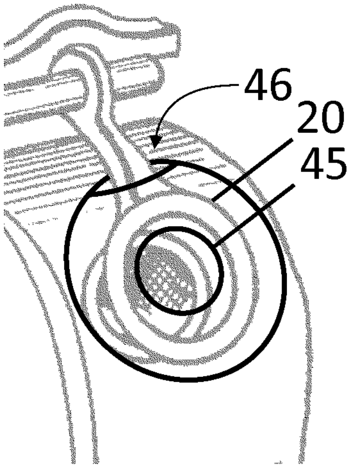
FIG. 7 is a schematic perspective view of a portion of a clarinet in which a tone hole ring adapter in the form of a slipcover has been fitted to a tone hole ring.
Figure 8:
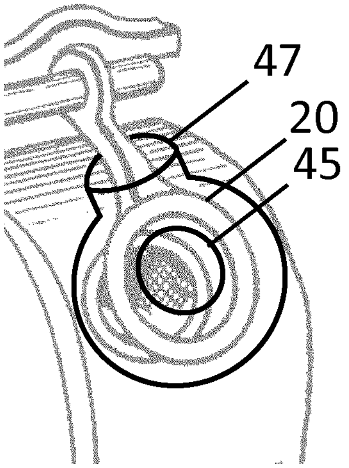
FIG. 8 is a schematic perspective view of a portion of a clarinet in which a tone hole ring adapter in the form of a stemmed slipcover has been fitted to a tone hole ring.

A variety of shapes, sizes, and configurations are suitable for a tone hole ring adapter. As described above, an adapter may be formed from a sleeve or tube of elastic material. As shown in FIG. 7, an adapter may be formed as a slipcover with top and bottom layers and side passage 46 through which the tone hole ring 20 is passed, so that the slipcover encases the tone hole ring. As shown in FIG. 8, a slipcover aperture may include stem 47. A slipcover-style adapter should be made of an especially thin, flexible, and/or elastic material, at least on the bottom layer to accommodate the tone hole turret in order to allow the tone hole ring to reach the closed position essentially without obstruction. As shown in FIGS. 8A-E, adapter 48 could be applied directly to the top surface 15 of turret 14, typically in the form of a single layer with adhesive on the underside.

Figure 9:
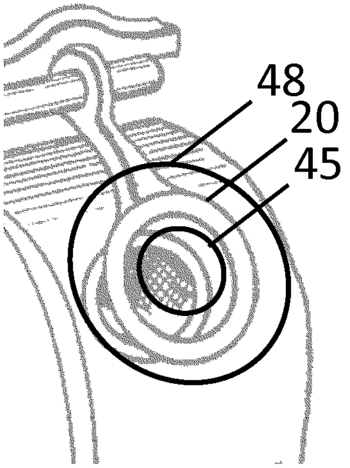
FIG. 9 is a schematic perspective view of a portion of a clarinet in which a tone hole ring adapter in the form of a disk has been placed on a tone hole ring.
Figure 8A:
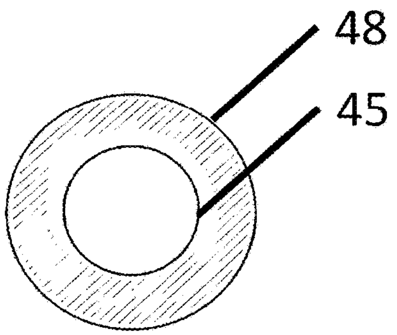
FIGS. 8A-E are top, isometric, side, in situ, and schematic median longitudinal cross-section views, respectively, of a clarinet tone hole adapter applied directly to the top surface of a tone hole turret.
Figure 8B:
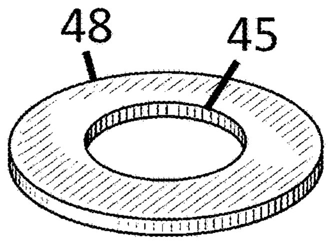
Figure 8C:
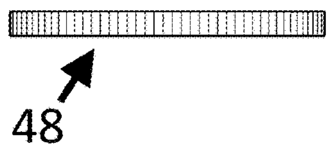
Figure 8D:
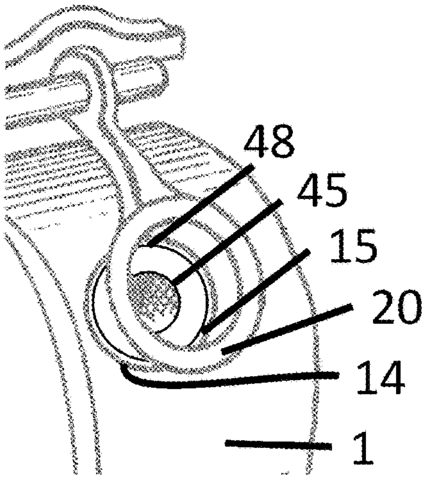
Figure 8E:
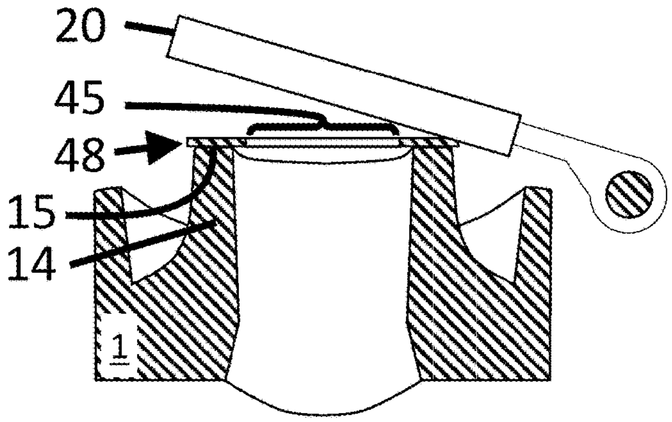
Figure 9A:
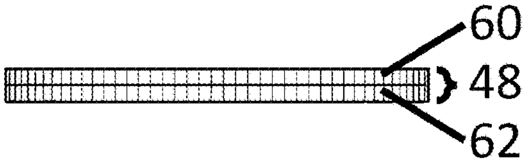
FIGS. 9A-B are side and isometric views, respectively, of an adapter disk having a top component and a bottom component.
Figure 9B:
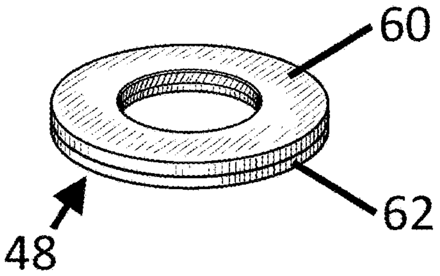

As shown in FIG. 9, an adapter may be a flat (or essentially flat) disk 48 placed on top of tone hole ring 20. Disk 48 may be circular, oval, or elliptical. It may also be polygonal (though still may be referred to figuratively as a "disk"). The underside of disk 48 may include an adhesive material or a deformable material, such as glue, wax, or putty, to affix the disk to ring 20 with an air-tight seal. Disk 48 may be rigid or semirigid, or may have a rigid or semirigid component together with a flexible component. For example, as shown in FIGS. 9A-B, disk 48 may have rigid top component 60 made of plastic or metal and bottom component 62 made of cork, felt, or other material typically used in clarinet key pads. The bottom component may be a bladder typically used in clarinet key pads. An adapter can include a top piece with only an annulus of adhesive provided on the underside surface that corresponds to the tone hole ring, so that there is no adhesive on the underside that is exposed to the turret. An adapter can include a top piece with adhesive provided on the underside, and a second piece of material covering the portion of the adhesive corresponding to the inner diameter of the tone hole ring (that is, the turret location), similarly to prevent unwanted sticking to the turret. The second piece would have an aperture if there is an aperture in the top piece.

Figure 10:
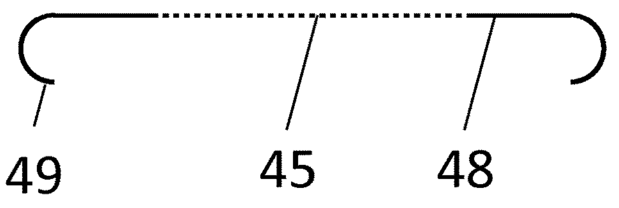
FIG. 10 is a schematic cross-sectional view of an adapter having a peripheral clip.
Figure 11:
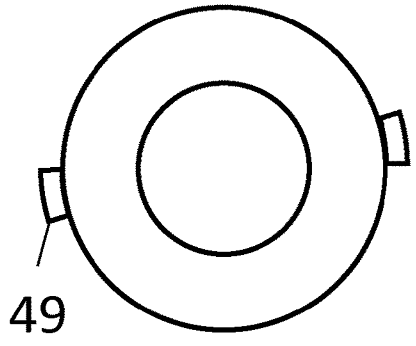
FIG. 11 is a schematic top view of an adapter having two peripheral clips.

As shown in FIG. 10, disk 48 may include side clip 49 that clips around ring 20. Side clip 49 may extend circumferentially around disk 48 or may be formed by a series of clips distributed around the circumference, such as two clips as shown in FIG. 11. Clips may be lined with rubber or another material to improve grip on ring 20 and/or help create an air-tight seal. Disk 48 may be made of flexible materials, such as plastic, paper, electrical tape, or other adhesive tape. In one embodiment, an adapter can be formed from two pieces of opposing adhesive tape between which a tone hole ring is sandwiched. In another embodiment, an adapter may include an annular ring of paper or cardboard (resembling a binder paper hole reinforcement). Adapters, regardless of the particular form, can include a transverse passage through the adapter, represented in the drawings by aperture 45, to allow airflow from the tone hole when a finger is not pressing the tone hole ring. An adapter with more than one layer, such as an upper layer positioned on the upper side of the tone hole ring and a lower layer positioned on the bottom side of the tone hole ring, may have apertures that are in register with one another, that is, aligned with one another, to define the transverse passage.

Figure 12:
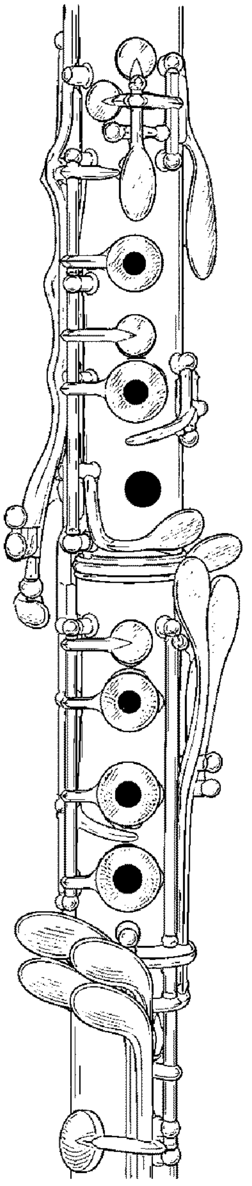
FIG. 12 depicts a clarinet with tone hole ring adapters fitted to the five visible tone hole rings.
Figure 13:
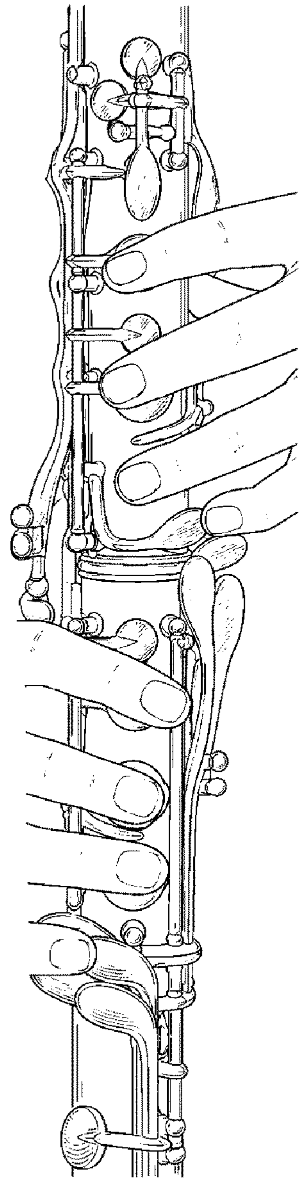
FIG. 13 depicts a clarinet with tone hole ring adapters fitted to the five visible tone hole rings with a player’s hands in position pressing each of the rings to its closed position.

FIG. 12 depicts a clarinet with tone hole ring adapters fitted to the five visible tone hole rings. Each adapter was cut from a piece of electrical tape and placed on the top surface of each tone hole ring with its adhesive surface contacting the ring. A hole was cut in the center of each piece of electrical tape to serve as an aperture. FIG. 13 depicts the same clarinet shown in FIG. 12 with a player's hands positioned on the clarinet and holding all visible tone hole rings in their closed positions.

A wide variety of materials, shapes, sizes, and properties are suitable for a tone hole ring adapter. An adapter could be made from thin latex or another elastomer. An adapter could be made of a deformable plastic, such as plastic wrap made from polyethylene, low-density polyethylene, polyvinyl chloride, or polyvinylidene chloride. In the case of plastic wrap, the wrap could simply be folded over the tone hole ring and pressed together. Other materials include fabric and felt. Such materials should be air-tight or treated to be air-tight, such as being impregnated with wax or plastic or coated with a sealant, as in the tip of a glove. An adapter could be made from a piece of plastic wrap, such as is used for food storage, folded over the tone hole ring.

I claim:

1. A method of facilitating clarinet playing, comprising reducing the diameter of one or more tone holes on the clarinet by adhering an adapter to a top surface of a turret of a tone hole of the clarinet with an air-tight seal wherein the adapter consists of a flat disk having rigid or semirigid material and an adhesive on an underside of the disk that adheres the adapter to the top surface of the turret of the tone hole, the disk comprising an aperture defining a central void in the disk.

2. The method of claim 1, wherein the disk comprises more than one layer.

3. The method of claim 1, wherein the clarinet is a Boehm system clarinet, and only one tone hole, being a lowest tone hole of the Boehm system clarinet above which a ring is positioned, is reduced in diameter.

4. The method of claim 1, wherein the disk comprises a top component and a bottom component.

5. The method of claim 4, wherein the rigid or semirigid material forms one of the top component and the bottom component, and a flexible material forms the other of the top component and the bottom component.

6. The method of claim 1, wherein the adapter is removably adhered by the adhesive to the top surface of the turret of the tone hole.

7. The method of claim 6, wherein the turret comprises a bore wall extending above a main body surface of the clarinet.

8. The method of claim 7, wherein the bore wall terminates with the top surface of the turret.

9. The method of claim 8, wherein the top surface of the turret of the tone hole is flat.

10. The method of claim 9, wherein the diameter of only one tone hole is reduced, and the tone hole to which the adapter is adhesively adhered is a lowest tone hole on the clarinet above which a ring is positioned.

11. The method of claim 10, wherein the clarinet is a Boehm system clarinet, and the ring positioned above the lowest tone hole is pivotably received in a ring sink surrounding the turret of the lowest tone hole.

12. The method of claim 11, wherein the disk comprises more than one layer.

13. A method of facilitating clarinet playing the method comprising reducing a diameter of a tone hole of the clarinet, wherein the tone hole diameter reduction comprises removably adhering an adapter to a top surface of the tone hole, the adapter consisting of a flat disk and an adhesive on an underside of the flat disk that adheres the adapter to the top surface of the tone hole, and wherein when the adapter is removably adhered to the top surface of the tone hole, a temporary tone hole formed by a central void defined in the adapter is provided for the tone hole.

14. The method of claim 13, wherein the disk is configured with a rigid or semi-rigid material.

15. The method of claim 13, wherein the tone hole is a lowest tone hole on the clarinet above which a ring is positioned.

16. The method of claim 13, wherein the tone hole is defined by a circumferential bore wall extending above a main body surface of the clarinet and terminating at the top surface of the tone hole.

17. The method of claim 16, wherein the top surface of the tone hole is flat.

18. The method of claim 13, wherein the adhesive removably adheres the adapter to the top surface of the tone hole with an air-tight seal between the adapter and the top surface of the tone hole to provide the temporary tone hole.

19. The method of claim 13, wherein the disk comprises more than one layer.

20. The method of claim 19, wherein the disk comprises a top component and a bottom component, a rigid or semirigid material forming one of the top component and the bottom component, and a flexible material forming the other of the top component and the bottom component.

* * * * *